United States Patent

Wakashiro et al.

(12)

(10) Patent No.: US 6,404,332 B1
(45) Date of Patent: Jun. 11, 2002

(54) SHIFT POSITION INDICATING DEVICE FOR HYBRID VEHICLE

(75) Inventors: Teruo Wakashiro; Shinichi Kitajima; Hideyuki Takahashi; Asao Ukai; Hironao Fukuchi, all of Wako (JP)

(73) Assignee: Honda Giken-Kogyo Kabushiki Kaisha, Tokyo (JP)

( * ) Notice: Subject to any disclaimer, the term of this patent is extended or adjusted under 35 U.S.C. 154(b) by 163 days.

(21) Appl. No.: 09/615,730

(22) Filed: Jul. 13, 2000

(30) Foreign Application Priority Data

Jul. 15, 1999 (JP) .......................................... 11-201059

(51) Int. Cl.⁷ ................................................ B60Q 1/00
(52) U.S. Cl. ......................... 340/456; 340/441; 74/337; 180/65.2; 180/338; 475/158; 477/5; 477/20
(58) Field of Search ................................ 340/438, 439, 340/441, 456; 74/337; 180/65.2, 338; 475/158; 477/5, 20

(56) References Cited

U.S. PATENT DOCUMENTS

| 4,042,056 | A | * | 8/1977 | Horwinski | 180/65.2 |
|---|---|---|---|---|---|
| 4,564,906 | A | * | 1/1986 | Stephan et al. | 340/456 |
| 4,712,452 | A | * | 12/1987 | Hibino et al. | 340/456 |
| 4,719,820 | A | * | 1/1988 | Hibino et al. | 340/456 |
| 6,033,338 | A | * | 3/2000 | Jackson et al. | 477/44 |
| 6,046,673 | A | * | 4/2000 | Michael et al. | 340/456 |

FOREIGN PATENT DOCUMENTS

JP        60-47128        10/1985

* cited by examiner

*Primary Examiner*—Daniel J. Wu
(74) *Attorney, Agent, or Firm*—Armstrong, Westerman, Hattori, McLeland & Naughton, LLP

(57) ABSTRACT

Disclosed herein is a shift position indicating device for indicating a recommended shift position to a driver of a hybrid vehicle having an engine for driving a drive shaft of the vehicle, a motor for assisting a drive force applied to the drive shaft by electrical energy, and a battery for supplying power to the motor and storing electrical energy output from the motor. The motor having a regenerative function of converting kinetic energy of the drive shaft into electrical energy. According to the shift position indicating device, it is determined whether or not the vehicle is in a high-load running condition, and when the vehicle is in the high-load running condition, the shift-down is recommended.

4 Claims, 5 Drawing Sheets

SHIFT POSITION INDICATING DEVICE FOR HYBRID VEHICLE

BACKGROUND OF THE INVENTION

1. Field of the Invention

The present invention relates to a shift position indicating device having means for recommending a proper shift position to a driver of a hybrid vehicle having a manual transmission.

2. Description of the Prior Art

Conventionally known is a shift position indicating device in a vehicle driven by an internal combustion engine, in which an intake negative pressure and a rotational speed of the engine are detected, and an indication of recommending shift-up to a driver of the vehicle is made when the intake vacuum is higher than a threshold pressure and/or when the engine rotational speed is higher than a threshold speed, while an indication of recommending shift-down to the driver is made when the engine rotational speed is extremely lowered (Japanese Patent Publication No. 60-47128 (Kokoku)). This device is designed so that the shift-up is indicated to mainly improve fuel economy when detecting an engine operating condition allowing a change from a present shift position to a shift position higher in gear ratio than the present shift position, and that the shift-down is indicated to avoid engine stall when the engine rotational speed is extremely lowered.

In the above conventional device, the shift-up is not indicated in a high-load running condition such as a hill-climbing condition, and the shift-down is not indicated as far as the engine rotational speed is not extremely lowered, then maintaining a present shift position.

In the case of applying such a shift position indicating device to a hybrid vehicle having an internal combustion engine and a motor as a prime mover, fuel consumption can be improved by indicating the shift-up during normal running. However, during high-load running such as hill climbing, a drive force is assisted by the motor to result in an increase in power consumption, so that electrical energy stored in electrical energy storing means such as a battery is decreased to cause a possibility that the drive assistance by the motor cannot be obtained when required. Further, when the electrical energy stored in the electrical energy storing means is decreased, it is controlled to preferentially store electrical energy into the electrical energy storing means. As a result, a problem that the drive assistance by the motor becomes more difficult to perform, which may deteriorate the running performance during normal running may be deteriorated.

SUMMARY OF THE INVENTION

It is accordingly an object of the present invention to provide a shift position indicating device which can accurately recommend a shift position suitable for a hybrid vehicle and can properly maintain the electrical energy stored in the electrical energy storing means.

According to the present invention, there is provided a shift position indicating device for indicating a recommended shift position to a driver of a hybrid vehicle having an engine for driving a drive shaft of said vehicle, a motor for assisting a drive force applied to said drive shaft by electrical energy, said motor having a regenerative function of converting kinetic energy of said drive shaft into electrical energy, and electrical energy storing means for supplying power to said motor and storing electrical energy output from said motor. This sift position indicating device is characterized in the improvement comprising vehicle operating condition detecting means for detecting an operating condition of said vehicle, said vehicle operating condition detecting means having high-load running detecting means for detecting a high-load running condition of said vehicle, and shift-down recommending means for recommending shift-down to said driver according to said operating condition detected by said vehicle operating condition detecting means, said shift-down recommending means recommending the shift-down under the condition that said vehicle is in said high-load running condition.

With this configuration, shift-down is recommended to the driver under the condition that the vehicle is in the high-load running condition, according to the detected vehicle operating condition. Then, the recommended shift-down recommended is carried out by the driver, and the vehicle is accordingly controlled so that the load on the engine to generate a drive force for the vehicle is increased and the load on the motor is decreased. As a result, the continuation of large power consumption by the motor can be prevented to thereby avoid an extreme reduction in electrical energy stored in the electrical energy storing means and to allow proper assistance of the drive force by the motor as required.

Preferably, said high-load running detecting means includes high-load operating condition detecting means for detecting a high-load operating condition of said engine and vehicle speed detecting means for detecting a vehicle speed of said vehicle, and determines that said vehicle is in said high-load running condition when said engine is in said high-load operating condition and a change in said vehicle speed is small.

The condition that "a change in said vehicle speed is small" is detected, for example, by detecting that the deviation between the detected vehicle speed and an average vehicle speed (the deviation=the vehicle speed−the average vehicle speed) is less than or equal to a predetermined deviation. Accordingly, the high-load running condition such as a hill-climbing condition can be accurately detected.

Preferably, said high-load operating condition detecting means determines that said engine is in said high-load operating condition when an intake pipe pressure of said engine is higher than a determination threshold which is set higher with an increase in remaining charge of said electrical energy storing means or when a parameter indicative of driver's intention of acceleration of said vehicle is greater than a determination threshold which is set higher with an increase in remaining charge of said electrical energy storing means.

Accordingly, the recommendation of more suitable shift position can be effected according to the remaining charge of the electrical energy storing means.

Other objects and features of the invention will be more fully understood from the following detailed description and appended claims when taken with the accompanying drawings.

DETAILED DESCRIPTION OF THE PREFERRED EMBODIMENTS

A preferred embodiment of the present invention will now be described with reference to the drawings.

Figure 1:
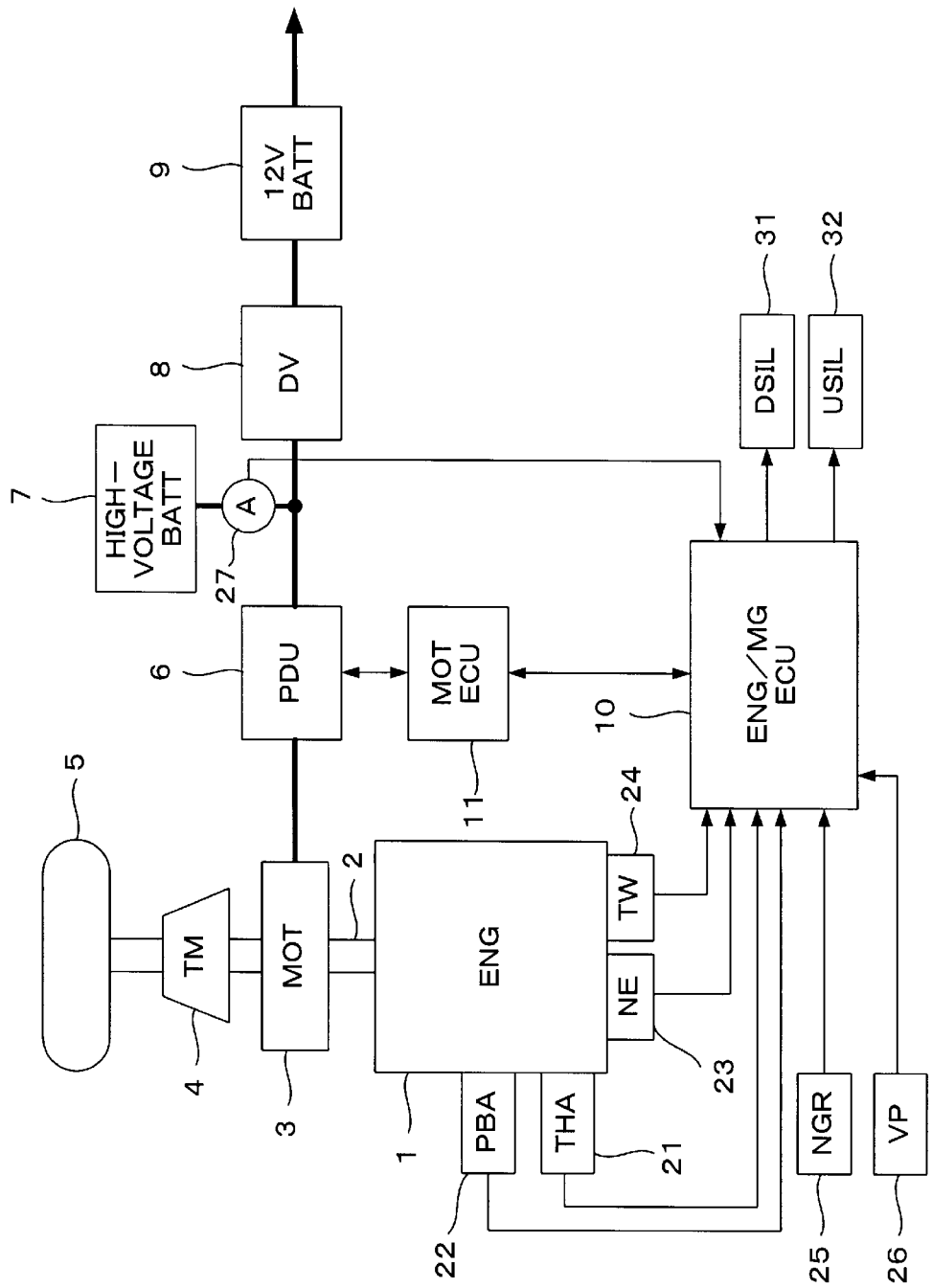
FIG. 1 is a block diagram showing the configuration of a shift position indicating device according to a preferred embodiment of the present invention.

FIG. 1 is a block diagram showing the configuration of an essential part of a hybrid vehicle according to a preferred embodiment of the present invention. Reference numeral 1 denotes an internal combustion engine (which will be hereinafter referred to as "engine"). A drive shaft 2 is driven by the engine 1 so as to drive a drive wheel 5 through a manual transmission 4. A motor 3 is provided so as to directly rotate the drive shaft 2. The motor 3 also has a regenerative function such that kinetic energy of the rotation of the drive shaft 2 is converted into electrical energy, which is then output. The motor 3 is connected to a power drive unit (which will be hereinafter referred to as "PDU") 6. The PDU 6 is connected through a current sensor 27 to a high-voltage battery 7 as the electrical energy storing means. The high-voltage battery 7 may be replaced by an electrical double layer capacitor having a large electrostatic capacity. The PDU 6 is also connected to a voltage reducer 8 for reducing an output voltage from the high-voltage battery 7 to supply a reduced voltage to a 12-V battery 9. An output from the 12-V battery 9 is supplied to various electrical devices mounted on the vehicle.

The PDU 6 is connected to a motor electronic control unit (which will be hereinafter referred to as "MOTECU") 11 for controlling the motor 3. The MOTECU 11 is connected to an engine/management electronic control unit (which will be hereinafter referred to as "ENG/MGECU") 10 for controlling the engine 1 and monitoring an electrical energy quantity in the high-voltage battery 7 to perform energy management. The MOTECU 11 controls drive assistance and regeneration by the motor 3 through the PDU 6. The current sensor 27 is connected to the ENG/MGECU 10, and a detection signal from the current sensor 27 is supplied to the ENG/MGECU 10.

The engine 1 is provided with a throttle valve opening sensor 21 for detecting a throttle valve opening THA, an intake pipe absolute pressure sensor 22 for detecting an absolute pressure PBA in an intake pipe of the engine 1 at a position downstream of the throttle valve, an engine rotational speed sensor 23 for detecting a rotational speed NE of the engine 1, and an engine coolant temperature sensor 24 for detecting an engine coolant temperature TW. Detection signals output from these sensors 21, 22, 23, and 24 are supplied to the ENG/MGECU 10. Further, the vehicle is provided with a shift position sensor 25 for detecting a shift position NGR of the transmission 4, and a vehicle speed sensor 26 for detecting a running speed (vehicle speed) VP of the vehicle. Detection signals output from these sensors 25 and 26 are also supplied to the ENG/MGECU 10.

The ENG/MGECU 10 includes a CPU (Central Processing Unit), ROM (Read Only Memory), RAM (Random Access Memory), and an input/output circuit. The ENG/MGECU 10 controls a fuel amount to be supplied to the engine 1 according to the detection signals from the above sensors, and also controls drive assistance and regeneration by the motor 3 through the MOTECU 11. More specifically, the ENG/MGECU 10 controls assistance of a drive force by the motor 3 during acceleration of the vehicle and regeneration by the motor 3 during deceleration or cruising of the vehicle according to the engine rotational speed NE, throttle valve opening THA, engine load (PBA), vehicle speed VP, etc.

The ENG/MGECU 10 performs on/off control of a shift-down indicator lamp 31 and a shift-up indicator lamp 32 each for recommending changing of a shift position to a driver of the vehicle. The shift-down indicator lamp 31 is a lamp for recommending changing of a present shift position to a lower-speed shift position higher in transmission gear ratio than the present shift position (e.g., changing from a fourth position to a third position), and the shift-up indicator lamp 32 is a lamp for recommending changing of a present shift position to a higher-speed shift position lower in transmission gear ratio than the present shift position (e.g., changing from a third position to a fourth position). These lamps 31 and 32 are provided on an indicator panel arranged in front of the driver as shown in FIG. 2.

Figure 2:
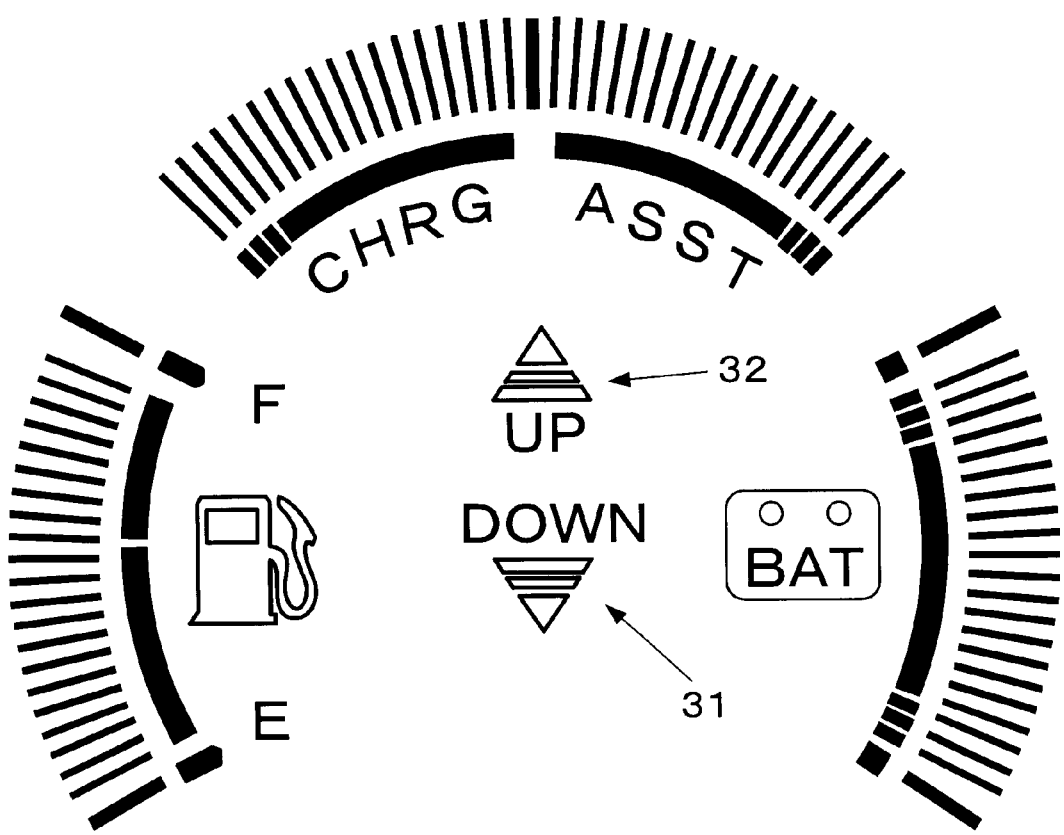
FIG. 2 is a schematic view showing an example of the arrangement of a shift-down indicator lamp and a shift-up indicator lamp.

The indicator panel shown in FIG. 2 is further provided with a fuel indicator for indicating a remaining fuel amount, a battery indicator for indicating a remaining charge of the battery, and a regeneration/drive assistance indicator in addition to the shift-down indicator lamp 31 and the shift-up indicator lamp 32. Each of these indicators is provided with LED's (light emitting diode), which are arranged on the periphery of the indication panel, adapted to be turned on to effect indication.

Figure 3:
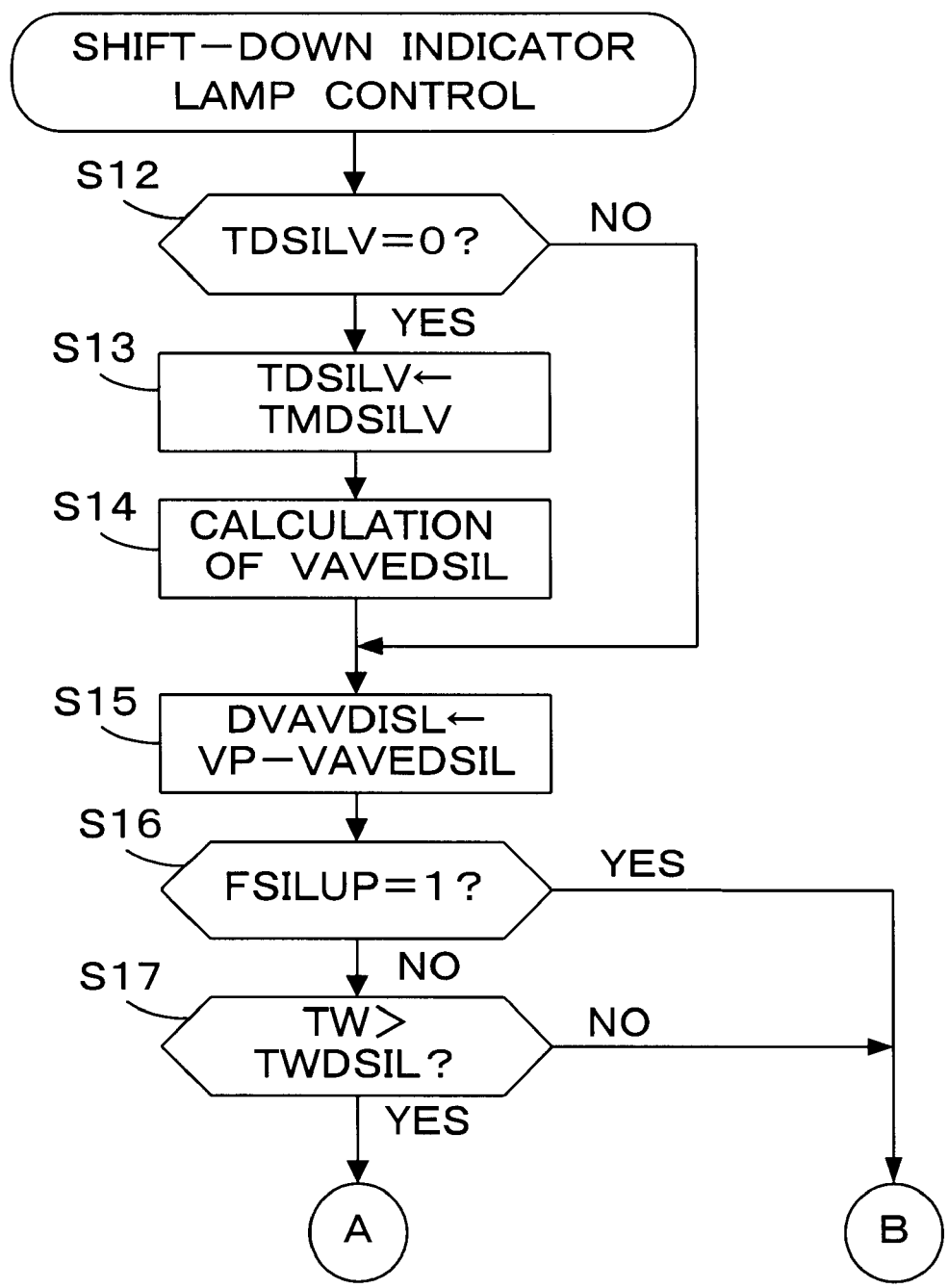
FIGS. 3 and 4 are flowcharts showing the processing for on-off control of the shift-down indicator lamp.
Figure 4:
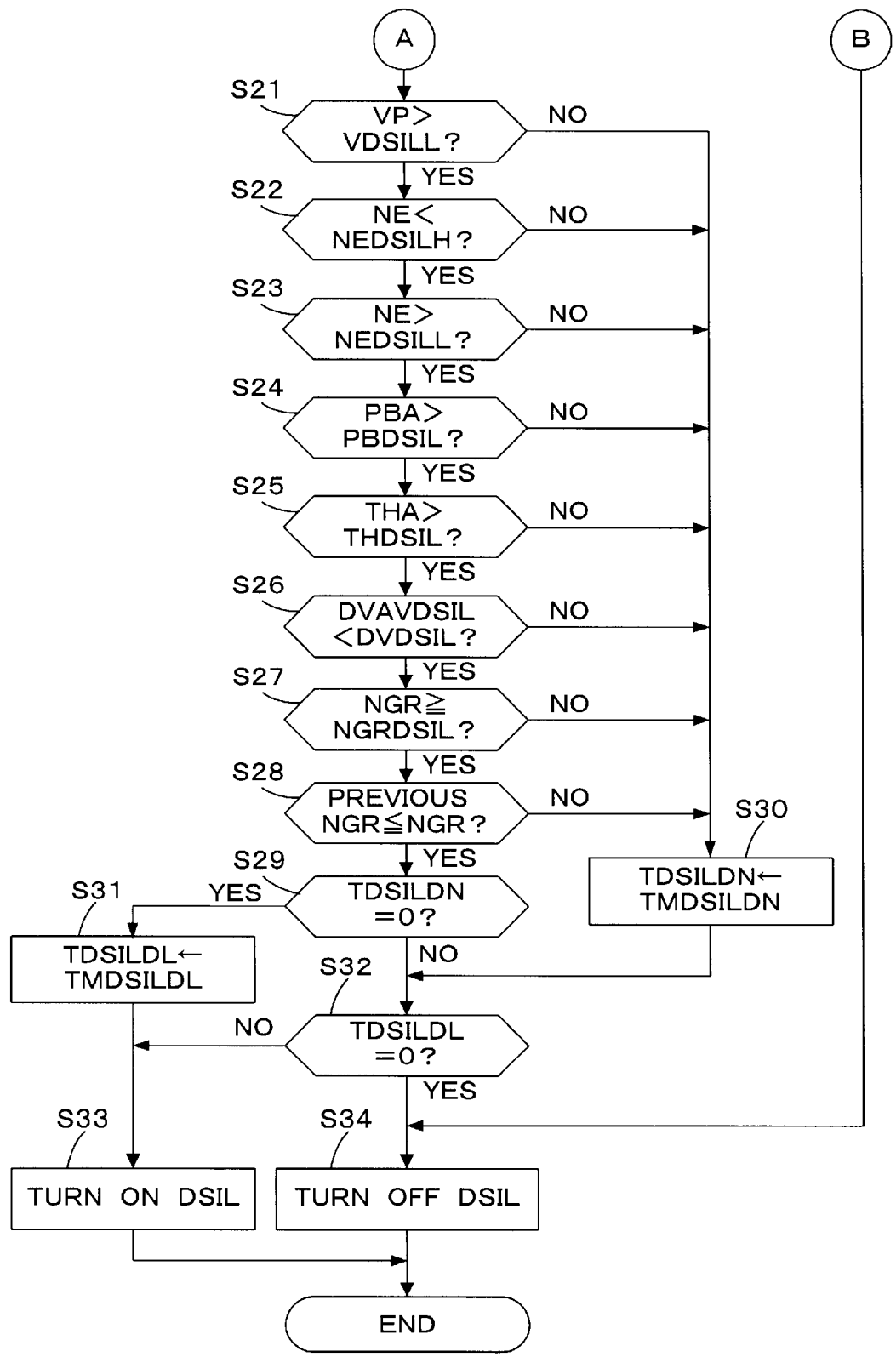

FIGS. 3 and 4 are flowcharts showing shift-down indicator lamp control processing for the on/off control of the shift-down indicator lamp 31. This processing is executed at predetermined time intervals by the ENG/MGECU 10.

In step S12, it is determined whether or not a timer value of a down-count timer TDSILV for measuring a time interval of calculation of an average vehicle speed is "0" (step S12). If TDSILV>0, the program proceeds to step S15 without calculating an average vehicle speed VAVEDSIL. If TDSILV=0, a predetermined time period TMDSILV (e.g., 1 second) is set in the down-count timer TDSILV, and it is then started (step S13) to calculate the average vehicle speed VAVEDSIL in accordance with the following equation.

$$VAVEDSIL = A \times VP + (1-A) \times VAVEDSIL$$

where A is an averaging coefficient set to a value between 0 and 1 (e.g., 0.25), VP is a present value of the detected vehicle speed, and VAVEDSIL on the right side is a previous calculated value of the average vehicle speed.

In step S15, a deviation DVAVDSIL (=VP−VAVEDSIL) between the average vehicle speed VAVEDSIL and the vehicle speed VP is calculated. Then, it is determined whether or not a shift-up indicator lamp flag FSILUP is "1" (step S16). The shift-up indicator lamp flag FSILUP is set by a processing not shown, and when set to "1", indicates that the shift-up indicator lamp 32 is on. If FSILUP=1, the program proceeds directly to step S34. If FSILUP=0, it is determined whether or not the engine coolant temperature TW is higher than a predetermined temperature TWDSIL (e.g., 60° C.) (step S17). If TW≦TWDSIL, the program proceeds to step S34, whereas if TW>TWDSIL, the program proceeds to step S21 (see FIG. 4).

In step S21, it is determined whether or not the vehicle speed VP is higher than a predetermined speed VDSILL (e.g., 10 km/h). If VP>VDSILL, it is determined whether or not the engine rotational speed NE is lower than a predetermined high speed NEDSILH (e.g., 3500 rpm) (step S22). If NE<NEDSILH, it is determined whether or not the engine rotational speed NE is higher than a predetermined low speed NEDSILL (e.g., 500 rpm) (step S23). If NE>NEDSILL, it is determined whether or not the intake absolute pressure PBA is higher than a predetermined pressure PBDSIL (e.g., 710 mmHg) (step S24). If PBA>PBDSIL, it is determined whether or not the throttle valve opening THA is larger than a predetermined valve opening THDSIL (e.g., 40 deg) (step S25). If THA>THDSIL, it is determined whether or not the deviation DVAVDSIL calculated in step S15 is smaller than a predetermined deviation DVDSIL (e.g., 2 km/h) (step S26). If DVAVSIL<DVDSIL, it is determined whether or not the shift position NGR is greater than or equal to a predetermined shift position NGRDSIL (e.g., third position) (step S27). If NGR≧NGRDSIL, it is determined whether or not the previous shift position NGR is less than or equal to the present shift position NGR (step S28).

If the answer in any one of steps S21 to S28 is negative (NO), a predetermined time period TMDSILDN (e.g., 3 seconds) is set in a down-count timer TDSILDN to be referred in step S29, and it is then started (step S30). Then, it is determined whether or not a timer value of a down-count timer TDSILDL for delay control which is started in step S31 is "0" (step S32). As far as the shift-down indicator lamp 31 is not turned on, the timer value of the timer TDSILDL is "0", so that the program proceeds to step S34, in which the off state of the shift-down indicator lamp (DSIL) 31 is kept, and this processing is ended.

Conversely, If all the answers in step S21 to S28 are affirmative (YES), that is, if the vehicle speed VP is higher than the predetermined speed VDSILL, the engine rotational speed NE falls between the predetermined high speed NEDSILH and the predetermined low speed NEDSILL, the intake absolute pressure PBA is higher than the predetermined pressure PBDSIL, the throttle valve opening THA is higher than the predetermined valve opening THDSIL (i.e., the engine is in a high-load condition), the deviation DVAVDSIL between the vehicle speed VP and the average vehicle speed VAVEDSIL is smaller than the predetermined deviation DVDSIL (i.e., the vehicle is hardly accelerated), the shift position NGR is greater than the predetermined shift position NGRDSIL (i.e., the transmission is in a low-gear ratio condition), and the shift position NGR is not changed to a shift position higher in transmission gear ratio than the previous shift position (i.e., the transmission is not shifted down), it is determined that the DSIL turning-on conditions have been satisfied. Then, it is determined whether or not the timer value of the timer TDSILDN started in step S30 is 0 (step S29). If TDSILDN>0, the off state of the shift-down indicator lamp 31 is kept (step S34). If TDSILDN=0, a predetermined delay time TMDSILDL (e.g., 0.5 second) is set in the delay control down-count timer TDSILDL, and it is then started (step S31), so that the shift-down indicator lamp 31 is turned on (step S33).

If at least one of the DSIL turning-on conditions is changed after execution of step S31, the program proceeds to steps S32 and S33 to keep the on state of the shift-down indicator lamp 31 only during the predetermined delay time TMDSILDL. After the predetermined delay time TMDSILDL has elapsed, the shift-down indicator lamp 31 is turned off.

One of the above-mentioned DSIL turning-on conditions is that the vehicle is in a high-load running condition such as a hill-climbing condition where the vehicle is hardly accelerated in spite of depression of an accelerator pedal by the driver. That is, in the case that the vehicle is in such a high-load running condition and that the other conditions (steps S16 and S17 shown in FIG. 3 and steps S21 to S23, S27, and S28 shown in FIG. 4) are satisfied, the shift-down indicator lamp 31 is turned on to recommend shift-down to the driver. Then, the shift-down is performed by the driver, so that the engine rotational speed NE becomes relatively high and the proportion of assistance of the drive force by the motor 3 is reduced, thereby preventing continuous consumption of large electric power. As a result, there is no possibility that the electrical energy quantity in the high-voltage battery 7 may become extremely small, and a sufficient drive assist power by the motor 3 can be obtained as required.

In this preferred embodiment, the throttle valve opening sensor 21, the intake pipe absolute pressure sensor 22, the engine rotational speed sensor 23, the engine coolant temperature sensor 24, the shift position sensor 25, the vehicle speed sensor 26, the steps S12 to S17 in FIG. 3, and the steps S21 to S28 in FIG. 4 correspond to the vehicle operating condition detecting means, and the steps S29 to S34 in FIG. 4 and the shift-down indicator lamp 31 correspond to the shift-down recommending means. More specifically, the steps S24 to S26 in FIG. 4 correspond to the high-load running detecting means. Further, the throttle valve opening THA corresponds to "the parameter indicative of the driver's intention of acceleration".

Figure 5A:
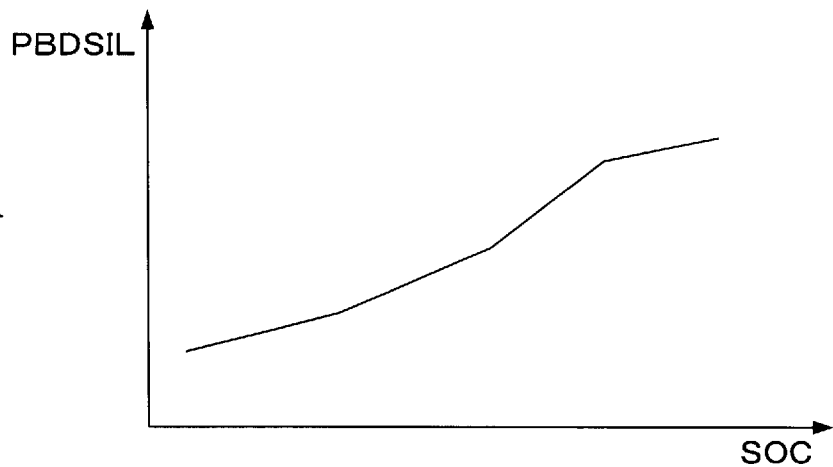
FIGS. 5A and 5B are graphs showing a setting method for thresholds of engine load parameters according to a remaining charge (SOC) of a battery.
Figure 5B:
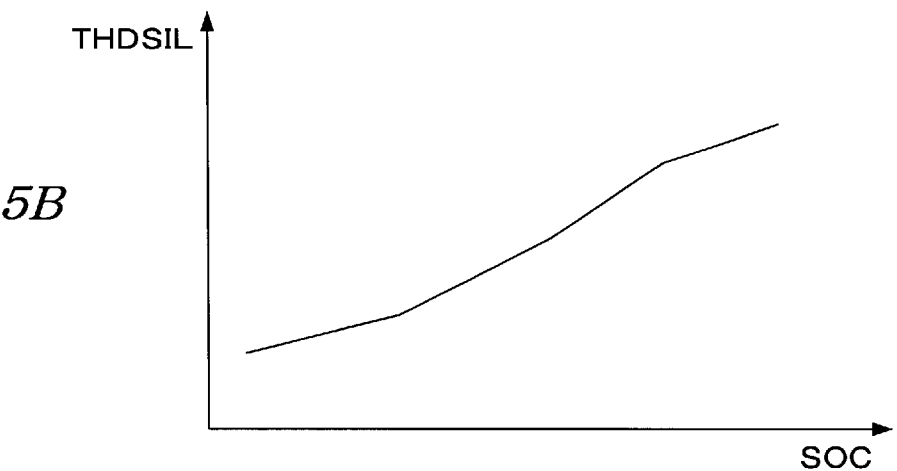

It should be noted that the present invention is not limited to the above preferred embodiment, but various modifications may be made without departing from the scope of the present invention. For example, while the predetermined pressure PBDSIL (step S24 in FIG. 4) and the predetermined valve opening THDSIL (step S25 in FIG. 4) both used to determine the high-load operating condition of the engine 1 are constant values in the above preferred embodiment, they may be set according to remaining charge SOC of the high-voltage battery 7 as shown in FIGS. 5A and 5B. The remaining charge SOC of the battery 7 is expressed by the proportion (%) of an electrical energy quantity stored in the battery 7 to the total capacity, and it is calculated by adding up the output from the current sensor 27 (adding up the current input into the battery 7 by regeneration as a positive value and the current output from the battery 7 for drive assistance as a negative value). As shown in FIGS. 5A and 5B, it is preferable to set larger values for the predetermined pressure PBDSIL and the predetermined valve opening THDSIL with an increase in the remaining charge SOC. Accordingly, the shift-down indicator lamp 31 is turned on in a lower-load operating condition with a decrease in the remaining charge SOC, thereby allowing the recommendation of more proper shift position.

Further, while the shift-down indicator lamp 31 is used as the shift-down recommending means in the above preferred embodiment, it is merely illustrative and any other methods may be adopted. For example, a present shift position and a recommended shift position may be indicated by numerals, or the recommendation of shift-down may be made by voice.

Further, the amount of depression of an accelerator pedal may be used in place of the throttle valve opening THA as the parameter indicative of the driver's intension of acceleration. Further, the shift position NGR may be detected according to the vehicle speed VP and the engine rotational speed NE rather than by using the shift position sensor.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a shift position indicating device for indicating a recommended shift position to a driver of a hybrid vehicle having an engine for driving a drive shaft of said vehicle, a motor for assisting a drive force applied to said drive shaft by electrical energy, said motor having a regenerative function of converting kinetic energy of said drive shaft into electrical energy, and electrical energy storing means for supplying power to said motor and storing electrical energy output from said motor; the improvement comprising:

vehicle operating condition detecting means for detecting an operating condition of said vehicle, said vehicle operating condition detecting means having highload running detecting means for detecting a high-load running condition of said vehicle; and shift-down recommending means for recommending shift-down to said driver according to said operating condition detected by said vehicle operating condition detecting means;

said shift-down recommending means recommending the shift-down under the condition that said vehicle is in said high-load running condition.

2. A shift position indicating device according to claim 1, wherein said high-load running detecting means includes high-load operating condition detecting means for detecting a high-load operating condition of said engine and vehicle speed detecting means for detecting a vehicle speed of said vehicle, and determines that said vehicle is in said high-load running condition when said engine is in said high-load operating condition and a change in said vehicle speed is small.

3. A shift position indicating device according to claim 2, wherein said high-load operating condition detecting means determines that said engine is in said high-load operating condition when an intake pressure of said engine is higher than a determination threshold which is set higher with an increase in remaining charge of said electrical energy storing means.

4. A shift position indicating device according to claim 2, wherein said high-load operating condition detecting means determines that said engine is in said high-load operating condition when a parameter indicative of driver's intention of acceleration of said vehicle is greater than a determination threshold which is set higher with an increase in remaining charge of said electrical energy storing means.

* * * * *